US012668694B2

(12) United States Patent
Fu et al.

(10) Patent No.: US 12,668,694 B2
(45) Date of Patent: *Jun. 30, 2026

(54) RECYCLED MATERIAL BASED ON IN-SITU COMPATIBILIZATION AND CHAIN EXTENSION AND PREPARATION METHOD THEREFOR

(71) Applicant: CHINA NATIONAL ELECTRIC APPARATUS RESEARCH INSTITUTE CO., LTD., Guangdong (CN)

(72) Inventors: Yonggao Fu, Guangdong (CN); Nuo Cao, Guangdong (CN); Jiaqi Hu, Guangdong (CN); Ling Wang, Guangdong (CN); Chao Wan, Guangdong (CN)

(73) Assignee: CHINA NATIONAL ELECTRIC APPARATUS RESEARCH INSTITUTE CO., LTD., Guangdong (CN)

( * ) Notice: Subject to any disclaimer, the term of this patent is extended or adjusted under 35 U.S.C. 154(b) by 515 days.

This patent is subject to a terminal disclaimer.

(21) Appl. No.: 18/274,467

(22) PCT Filed: Nov. 22, 2022

(86) PCT No.: PCT/CN2022/133450
§ 371 (c)(1),
(2) Date: Jul. 27, 2023

(87) PCT Pub. No.: WO2023/093705
PCT Pub. Date: Jun. 1, 2023

(65) Prior Publication Data
US 2024/0317986 A1      Sep. 26, 2024

(30) Foreign Application Priority Data

Nov. 26, 2021    (CN) .......................... 202111422495.3

(51) Int. Cl.
| | |
|---|---|
| *C08L 25/06* | (2006.01) |
| *C08L 23/12* | (2006.01) |
| *B29B 7/00* | (2006.01) |
| *B29B 7/48* | (2006.01) |
| *B29B 7/72* | (2006.01) |
| *B29B 9/06* | (2006.01) |
| *B29K 23/00* | (2006.01) |
| *B29K 25/00* | (2006.01) |
| *B29K 105/00* | (2006.01) |
| *B29K 105/26* | (2006.01) |

(52) U.S. Cl.
CPC .............. *C08L 25/06* (2013.01); *C08L 23/12* (2013.01); *B29B 7/007* (2013.01); *B29B 7/484* (2013.01); *B29B 7/72* (2013.01); *B29B 9/06* (2013.01); *B29K 2023/12* (2013.01); *B29K 2025/06* (2013.01); *B29K 2105/0014* (2013.01); *B29K 2105/26* (2013.01); *B29K 2995/0077* (2013.01); *B29K 2995/0089* (2013.01); *C08L 2205/025* (2013.01); *C08L 2205/035* (2013.01); *C08L 2205/08* (2013.01); *C08L 2205/14* (2013.01); *C08L 2207/20* (2013.01); *C08L 2312/00* (2013.01)

(58) Field of Classification Search
None
See application file for complete search history.

(56) References Cited

U.S. PATENT DOCUMENTS

| | | | | |
|---|---|---|---|---|
| 11,046,801 B2 * | 6/2021 | González | .............. | C08F 218/08 |
| 2002/0037965 A1 * | 3/2002 | Kinoshita | ............... | C08L 25/02 |
| | | | | 525/132 |
| 2002/0128382 A1 * | 9/2002 | Wang | ...................... | C08L 67/02 |
| | | | | 525/54.3 |

FOREIGN PATENT DOCUMENTS

| | | |
|---|---|---|
| CN | 102532734 | 7/2012 |
| CN | 104327438 | 2/2015 |
| CN | 106166820 | 11/2016 |
| CN | 106633455 | 5/2017 |
| CN | 108641265 | 10/2018 |
| CN | 112724571 | 4/2021 |
| CN | 112759876 | 5/2021 |
| CN | 114213852 | 3/2022 |
| CN | 114276641 | 4/2022 |

OTHER PUBLICATIONS

Cai Dong, "Study on Polypropylene/Polystyrene Blends In-situ Compatibilized by AICI3", China Plastics, Jul. 2007, with English abstract, pp. 44-47, vol. 21, No. 7.
Mónica F. Díaz et al., "Improvement of mechanical properties for PP/PS blends by in situ compatibilization", Polymer, Jun. 14, 2005, pp. 6096-6101, vol. 46.
"International Search Report (Form PCT/ISA/210) of PCT/CN2022/133450", mailed on Dec. 28, 2022, with English translation thereof, pp. 1-6.

* cited by examiner

*Primary Examiner* — Silvana C Runyan
(74) *Attorney, Agent, or Firm* — JCIP GLOBAL INC.

(57) ABSTRACT

A recycled material based on in-situ compatibilization and chain extension is mainly prepared from the following raw materials in parts by mass: 30-70 parts of waste HIPS, 30-70 parts of waste PP, 2-6 parts of POE, 0.1-0.4 part of an alkylation reaction catalyst, 0.1-0.3 part of a co-catalyst, and 2-8 parts of a macromolecular chain extender. Further, a preparation method for the recycled material based on in-situ compatibilization and chain extension is provided.

10 Claims, No Drawings

RECYCLED MATERIAL BASED ON IN-SITU COMPATIBILIZATION AND CHAIN EXTENSION AND PREPARATION METHOD THEREFOR

CROSS-REFERENCE TO RELATED APPLICATION

This application is a 371 of international application of PCT application serial no. PCT/CN2022/133450, filed on Nov. 22, 2022, which claims the priority benefit of China application no. 202111422495.3, filed on Nov. 26, 2021. The entirety of each of the above mentioned patent applications is hereby incorporated by reference herein and made a part of this specification.

TECHNICAL FIELD

The present disclosure belongs to a technical field of recycled materials, and more particularly, to a recycled material based on in-situ compatibilization and chain expansion and a preparation method therefor.

DESCRIPTION OF RELATED ART

As a polystyrene material with excellent cost performance and significantly improved toughness, high-impact polystyrene (HIPS) is widely applied in various industries including packaging, electronic and electrical products, and automobiles. However, after long-term service, it will be aged and thus degraded due to the action of photothermal oxygen and other effects, and produce hydroxyl groups, carboxyl groups and other active groups while causing the breakage of molecular chains, accompanied by changes in microscopic phase structure. The performances of aged waste HIPS are comprehensively reduced compared with new materials, but if the performances are not improved by modification, its overall application range will be severely limited.

On the other hand, polypropylene (PP) has the advantages of low density, no toxicity, low price, and easy processing, but also has the shortcomings such as low rigidity and gap sensitivity. The molecular structure of the aged waste PP will also be fractured or rearranged to form hydroxyl groups, carboxyl groups and other groups, resulting in an overall decline in macroscopic performances.

The alloying of polymer materials can synthesize better performances of various matrix materials to achieve high-value applications, and thus is also an important research and application direction. The preparation of polymer alloys from waste materials has a cost advantage, but the performances of a waste material substrate need to be repaired effectively to improve the compatibility between the substrates, in order to prepare a recycled alloy material with balanced performances and market demand.

Combined with the above situation, a polymer alloy is prepared from waste HIPS and waste PP. If hydroxyl groups, carboxyl groups and other active groups which are generated after the aging of waste HIPS and waste PP can be fully utilized to repair these two matrix materials through in-situ chain extension, their comprehensive performances can be promoted entirely. Meanwhile, the compatibility between the waste HIPS and the waste PP is effectively improved by a compatibilizer generated in situ. Therefore, a recycled alloy material with excellent comprehensive performances will be obtained. Because of the heavy use of waste materials, this recycled alloy material has a cost-effective advantage and environmentally-friendly properties, and thus has a wide range of application prospects.

SUMMARY OF THE DISCLOSURE

The present disclosure is to provide a recycled material based on in-situ compatibilization and chain extension. The recycled material uses the waste HIPS and the waste PP as raw materials, two types of chemical modifiers are used in a segmented and matched mode, and in-situ compatibilization and chain extension repairing effects are achieved by means of grafting and chain extension reactions, respectively. Therefore, the recycled HIPS/PP alloy material having excellent comprehensive performances is prepared by directly performing in-situ modification on the waste HIPS and the waste PP, and a high-valued attribute is also embodied while waste resources are fully used.

The present disclosure is also to provide a preparation method for the recycled material based on in-situ compatibilization and chain extension.

The present disclosure is achieved by providing as follows: a recycled material based on in-situ compatibilization and chain extension is mainly prepared from the following raw materials in parts by mass:

30-70 parts of waste HIPS;
30-70 parts of waste PP;
2-6 parts of POE (polyolefin elastomer);
0.1-0.4 part of an alkylation reaction catalyst;
0.1-0.3 part of a co-catalyst; and
2-8 parts of a macromolecular chain extender.

In the present disclosure, the raw materials of the recycled material based on in-situ compatibilization and chain extension mainly include the waste HIPS and the waste PP as two originally incompatible matrix phases. Firstly, under the catalytic action of the co-catalyst and the alkylation reaction catalyst. HIPS-g-PP and HIPS-g-POE grafts are generated through a Friedel-Crafts alkylation reaction. The grafts can play a good role in compatibilization of the waste HIPS component and the waste PP component in the blend. Then, by introducing the macromolecular chain extender, the macromolecular chain extender is allowed to undergo an in-situ chain extension reaction with hydroxyl groups and other active groups generated on aged chains of the waste HIPS and the waste PP under an extrusion condition to achieve broken chain growth. Meanwhile, through the similar compatibility in approximately similar structures of a HIPS main chain in the macromolecular chain expander and a main chain of the waste HIPS, the weakening of a microphase interface force after the aging of the waste HIPS is further improved. The co-catalyst cooperates with the alkylation reaction catalyst to promote the occurrence of the alkylation reaction, while POE can improve the aging interface structure of the waste PP phase and significantly improve the impact resistance of the waste PP phase, which is most obviously deteriorated due to aging, in addition to increasing the compatibility of the waste HIPS phase and the waste PP phase. Finally, a recycled HIPS/PP alloy material based on in-situ compatibilization and chain extension with excellent comprehensive performances is prepared.

Among the raw materials of the above-mentioned recycled material based on in-situ compatibilization and chain extension:

preferably, the waste HIPS is a flaky material obtained from waste HIPS (waste high impact polystyrene) which is crushed and homogenized.

3

Preferably, the waste PP is a flaky material obtained from waste PP (waste polypropylene) which is crushed and homogenized.

Preferably, the POE is a novel ethylene-octene copolymer elastomer material.

Preferably, the alkylation reaction catalyst is anhydrous aluminum chloride.

Preferably, the co-catalyst is styrene.

Preferably, the macromolecular chain extender is a high-impact polystyrene grafted glycidyl methacrylate (HIPS-g-GMA).

The present disclosure is achieved by providing as follows: the preparation method for the recycled material based on in-situ compatibilization and chain extension includes the following steps: mixing the waste HIPS, the waste PP, the POE, the alkylation reaction catalyst, and the co-catalyst according to the above dosage relationship to obtain a mixed material; adding the mixed material from a main feeding device of a twin screw extruder and melting the mixed material; controlling a screw speed to 40 to 80 rpm; adding the macromolecular chain extender to a fifth zone of a processing middle section of the twin screw extruder according to the above dosage relationship; blending with the molten mixed material; and extruding, drawing, cooling and pelletizing to obtain the recycled HIPS/PP alloy material based on in-situ compatibilization and chain extension.

In the above preparation method for the recycled material based on in-situ compatibilization and chain extension:

preferably, a processing temperature zone of the twin screw extruder is 175 to 235° C.

Further, temperatures of eight processing zones of the twin screw extruder are 180° C. 180° C. 185° C. 185° C. 235° C. 235° C., 230° C., and 230° C. in sequence.

In the present disclosure, HIPS-g-PP and HIPS-g-POE grafts are generated in situ through a Friedel-Crafts alkylation reaction under a molten state in the front four processing zones of the extruder. The grafts can play a good role in compatibilization of the waste HIPS component and the waste PP component in the blend. Then, by introducing the macromolecular chain extender in the rear four processing zones of the extruder, the macromolecular chain extender is allowed to undergo an in-situ chain extension reaction with hydroxyl groups and other active groups generated on aged chains of the waste HIPS and the waste PP under an extrusion condition to achieve broken chain growth. Meanwhile, through the similar compatibility in approximately similar structures of a HIPS main chain in the macromolecular chain extender and a main chain of the waste HIPS, the weakening of a microphase interface force after the aging of the waste HIPS is further improved. POE can improve the aging interface structure of the waste PP phase and significantly improve the impact resistance of the waste PP phase, which is most obviously deteriorated due to aging, in addition to increasing the compatibility of the waste HIPS phase and the waste PP phase. Finally, a recycled HIPS/PP alloy material based on in-situ compatibilization and chain extension with excellent comprehensive performances is prepared.

On the other hand, the processing temperatures of the four zones in the rear section and the four zones in the front section of the present disclosure has been actively increased, thereby achieving two main purposes: firstly, the alkylation reaction catalyst can be rapidly volatilized and removed through the jump increase of the processing temperature in the fifth zone, to avoid a chain breaking competition reaction at high temperature, and other side reactions that may occur after the introduction of the macromolecular chain extender

4 in the rear section. On the other hand, a higher temperature is also conducive to the effective occurrence of a chain extension reaction within a limited retention time, so as to achieve the effect of chain extension repair. Through a large number of tests, it has been proved that the screw speed is controlled to 40 to 80 rpm, the processing temperature zone in the rear four sections is about 230° C., and an in-situ chain extension effect is achieved. Therefore, the changes in the processing zones of the front and rear sections ensure the generation of a compatibilizer due to the alkylation reaction, but also do not affect a chain extension modification effect of the waste material substrate, so that the properties of the prepared recycled alloy are optimized.

The present disclosure provides as follows.

(1) Two types of chemical modifiers are used in a segmented and matched mode of the present disclosure, and in-situ compatibilization and chain extension repairing effects are achieved by means of grafting and chain extension reactions, respectively. Therefore, the recycled HIPS/PP alloy material is prepared by directly performing in-situ modification on the waste HIPS and the waste PP.

(2) The macromolecular chain extender of the same matrix is adopted in the present disclosure to extend a chain and improve an aged structure of the waste HIPS. POE is used to improve the aging interface structure of the waste PP phase and significantly improve the impact resistance of the waste PP phase, which is most obviously deteriorated due to aging, in addition to forming compatibilized grafts. Therefore, although the two matrix phases of the recycled alloy material prepared by the present disclosure are both aged waste materials, the continuity and microscopic order of their respective main chains have been repaired, and the compatibility between the two phases has also been guaranteed, so the comprehensive performances of the recycled alloy are excellent.

(3) Processing equipment used in the present disclosure does not need to be specially modified. Reactive extrusion can be performed and in-situ compatibilization and chain extension modification can be realized only through the optimization of process conditions and formulas, thereby achieving strong adaptability in application and promotion.

(4) With comprehensive ban in China on the import of waste plastics, the application potential of domestic waste plastic recycling technologies, especially high-value recycling technologies, is huge, so the present disclosure provides a brand new solution for the high-value utilization of waste plastics, which is conducive to promoting the green recycling of waste plastics and helping to achieve the goal of carbon neutrality, with good social and economic benefits.

DETAILED DESCRIPTION OF THE DISCLOSURE

The following raw materials are commercially available unless otherwise specified.

Example 1

A recycled material based on in-situ compatibilization and chain extension provided by the present embodiment is mainly prepared from the following raw materials in parts by mass:

50 parts of waste HIPS;

50 parts of waste PP;

5 parts of POE;

0.4 part of an alkylation reaction catalyst;

0.3 part of a co-catalyst; and 6 parts of a macromolecular chain extender.

The waste HIPS is a flaky material obtained from waste HIPS (waste high impact polystyrene) which is crushed and homogenized. The waste PP is a flaky material obtained from wasted PP (waste polypropylene) which is crushed and homogenized. The POE is a novel ethylene-octene copolymer elastomer material. The alkylation reaction catalyst is anhydrous aluminum chloride. The co-catalyst is styrene. The macromolecular chain extender is a high-impact polystyrene grafted glycidyl methacrylate (HIPS-g-GMA).

The preparation method for the recycled material based on in-situ compatibilization and chain extension includes the following steps: mixing the waste HIPS, the waste PP, the POE, the alkylation reaction catalyst, and the co-catalyst according to the above dosage relationship to obtain a mixed material; adding the mixed material from a main feeding device of a twin screw extruder and melting the mixed material; controlling a screw speed to 40 rpm; adding the macromolecular chain extender to a fifth processing zone of the twin screw extruder according to the above dosage relationship; blending with the molten mixed material; and extruding, drawing, cooling and pelletizing to obtain the recycled alloy material.

Further, the temperatures of the eight processing zones of the twin screw extruder are 180° C. 180° C. 185° C., 185° C., 235° C., 235° C. 230° C., and 230° C. in sequence.

Example 2

A recycled material based on in-situ compatibilization and chain extension provided by the present embodiment is mainly prepared from the following raw materials in parts by mass:

30 parts of waste HIPS;

70 parts of waste PP;

6 parts of POE;

0.4 part of an alkylation reaction catalyst;

0.3 part of a co-catalyst; and 4 parts of a macromolecular chain extender.

The above components are similar to the above example 1.

The preparation method for the recycled material based on in-situ compatibilization and chain extension includes the following steps: mixing the waste HIPS, the waste PP, the POE, the alkylation reaction catalyst, and the co-catalyst according to the above dosage relationship to obtain a mixed material; adding the mixed material from a main feeding device of a twin screw extruder and melting the mixed material; controlling a screw speed to 60 rpm; adding the macromolecular chain extender to a fifth processing zone of the twin screw extruder according to the above dosage relationship; blending with the molten mixed material; and extruding, drawing, cooling and pelletizing to obtain the recycled alloy material.

Further, the temperatures of the eight processing zones of the twin screw extruder are 175° C. 175° C., 180° C., 185° C. 225° C. 225° C. 225° C., and 230° C. in sequence.

Example 3

A recycled material based on in-situ compatibilization and chain extension provided by the present embodiment is mainly prepared from the following raw materials in parts by mass:

70 parts of waste HIPS;

30 parts of waste PP;

2 parts of POE;

0.2 part of an alkylation reaction catalyst;

0.1 part of a co-catalyst; and 8 parts of an HIPS-based macromolecular chain extender.

The above components are similar to the above example 1.

The preparation method for the recycled material based on in-situ compatibilization and chain extension includes the following steps: mixing the waste HIPS, the waste PP, the POE, the alkylation reaction catalyst, and the co-catalyst according to the above dosage relationship to obtain a mixed material; adding the mixed material from a main feeding device of a twin screw extruder and melting the mixed material; controlling a screw speed to 80 rpm; adding the macromolecular chain extender to a fifth processing zone of the twin screw extruder according to the above dosage relationship; blending with the molten mixed material; and extruding, drawing, cooling and pelletizing to obtain the recycled alloy material.

Further, the temperatures of the eight processing zones of the twin screw extruder are 180° C., 185° C., 185° C., 185° C., 225° C., 225° C., 235° C., and 235° C. in sequence.

The mechanical properties of the recycled materials based on in-situ compatibilization and chain extension prepared in Examples 1 to 3 are summarized in Table 1 below.

Table 1: Summary of mechanical properties of recycled materials prepared in Examples 1 to 3

| 136322usf_True translation | Impact strength (KJ/m$^2$) GB/T 1043 | Tensile strength (MPa) GB/T 1040 |
|---|---|---|
| Waste HIPS/Waste PP (1) | 2.2 | 21.8 |
| Example 1 | 8.9 | 35.0 |
| Example 2 | 8.4 | 32.8 |
| Example 3 | 8.1 | 32.3 |
| Comparative example 1 (2) | 7.3 | 29.4 |
| Comparative example 2 (3) | 4.7 | 25.4 |
| Comparative example 3 (4) | 5.8 | 28.1 |
| Comparative example 4 (5) | 6.9 | 29.0 |

In Table 1 above:

(1) the preparation method and steps are the same as Example 1, and the materials include 50 parts of waste HIPS and 50 parts of waste PP in proportions, but are free of the POE, HIPS-based macromolecular chain extender, alkylation reaction catalyst and co-catalyst;

(2) the preparation method and steps are the same as Example 1, and the materials include 50 parts of waste HIPS, 50 parts of waste PP, 5 parts of POE, and 6 parts of macromolecular chain extender in proportions, but are free of the alkylation reaction catalyst and co-catalyst;

(3) the preparation method and steps are the same as Example 1, and the materials include 50 parts of waste HIPS, 50 parts of waste PP, 5 parts of POE, 0.4 part of alkylation reaction catalyst, and 0.3 part of co-catalyst in proportions, but are free of the macromolecular chain extender;

(4) the preparation method, steps, and the materials are the same as Example 1, but the eight processing temperature zones are 180° C., 180° C., 185° C., 185° C., 185° C., 185° C., 185° C., and 185° C., respectively; and

(5) the preparation method, steps, and the materials are the same as Example 1, but the eight processing temperature zones are 230° C., 235° C., 235° C., 235° C., 235° C., 235° C., 235° C., and 235° C., respectively.

From the above specific experimental data, it can be seen that compared with unmodified waste HIPS/waste PP, the mechanical properties of the recycled material HIPS/PP alloy prepared by the present disclosure are comprehensively improved, and the modification effect is remarkable.

Example 1 differs from Comparative example 1 in whether the alkylation reaction generates a macromolecular compatibilizer to compatibilize the blending system. It can be seen that after the addition of the macromolecular chain extender, the impact and tensile strength of the recycled alloy have been significantly improved, but its increase rate is lower than that of components of the alkylation reaction catalyst. Therefore, it is proved that the grafting modification of alkylation reaction is very meaningful, which is conducive to improving the compatibility of blends and thus improving the comprehensive performances of the recycled material.

Example 1 differs from the comparative example 2 in whether to add a HIPS-based macromolecular chain extender. It can be seen that if only the alkylation catalyst is added, but the macromolecular chain extender is not added, the comprehensive performances of the recycled material are only slightly improved, which proves that the compatibility of the recycled alloy and the basic properties of each matrix are very important. However, only the compatibility of the recycled alloy is promoted. Although the microscopic interface is improved, the overall performances are still low due to the shortcomings in the comprehensive properties of each matrix. Under the combined effect of in-situ compatibilization and in-situ chain extension, the performances of the recycled alloy have been significantly improved.

Example 1 differs from Comparative Example 3 and Comparative Example 4 in the difference in the processing temperatures. The results prove that the processing temperatures of the four zones in the rear section are actively and rapidly increased compared with the processing temperatures of the four zones in the front section, which is very effective for the modification effect. The processing temperatures of the four zones in the front section are about 180° C., which not only ensures the alkylation reaction, but also avoids the premature volatilization of aluminum chloride at high temperature and the potential chain breaking competition reaction. The processing temperatures of the four zones in the rear section are about 230° C., which can quickly volatilize aluminum chloride and ensure the effective implementation of the chain extension reaction.

In summary, through the two-step reactive modification of the present disclosure, namely alkylation reaction modification and in-situ chain extension repair modification, a double-effect modification effect is achieved, thereby significantly improving the comprehensive performances of recycled material. It is very conducive to improving the environmental adaptability of recycled products and broadening their application scenarios. Recycled alloy products with such comprehensive properties have good market prospects.

The above examples are preferred examples of the present disclosure. The POE, the macromolecular chain extender HIPS-g-GMA, the alkylation reaction catalyst $AlCl_3$, and the co-catalyst styrene selected in the examples are obtained from commercially available off-the-shelf products.

The above-mentioned embodiments are not limited by preferred examples of the present disclosure, and the waste HIPS, waste PP and other raw materials selected in the above embodiments can also be commercially available off-the-shelf products with similar properties. Any other changes, modifications, substitutions, combinations, and simplifications that do not deviate from the spirit and principle of the present disclosure should be equivalent substitutions and are included within the protection scope of the present disclosure.

What is claimed is:

1. A recycled material based on in-situ compatibilization and chain extension, wherein the recycled material is mainly prepared from the following raw materials in parts by mass:
   30-70 parts of waste high-impact polystyrene;
   30-70 parts of waste polypropylene;
   2-6 parts of polyolefin elastomer;
   0.1-0.4 part of an alkylation reaction catalyst;
   0.1-0.3 part of a co-catalyst; and
   2-8 parts of a macromolecular chain extender.

2. The recycled material based on in-situ compatibilization and chain extension according to claim 1, wherein the waste high-impact polystyrene is a flaky material obtained from waste high impact polystyrene which is crushed and homogenized.

3. The recycled material based on in-situ compatibilization and chain extension according to claim 1, wherein the waste polypropylene is a flaky material obtained from waste polypropylene which is crushed and homogenized.

4. The recycled material based on in-situ compatibilization and chain extension according to claim 1, wherein the polyolefin elastomer is a novel ethylene-octene copolymer elastomer material.

5. The recycled material based on in-situ compatibilization and chain extension according to claim 1, wherein the alkylation reaction catalyst is anhydrous aluminum chloride.

6. The recycled material based on in-situ compatibilization and chain extension according to claim 1, wherein the co-catalyst is styrene.

7. The recycled material based on in-situ compatibilization and chain extension according to claim 1, wherein the macromolecular chain extender is a high-impact polystyrene grafted glycidyl methacrylate.

8. A preparation method for the recycled material based on in-situ compatibilization and chain extension according to claim 1, comprising the following steps:
   mixing the waste high-impact polystyrene in 30-70 parts, the waste polypropylene in 30-70 parts, the polyolefin elastomer in 2-6 parts, the alkylation reaction catalyst in 0.1-0.4 part, and the co-catalyst in 0.1-0.03 part to obtain a mixed material;
   adding the mixed material from a main feeding device of a twin screw extruder and melting the mixed material;
   controlling a screw speed to 40 to 80 rpm;
   adding the macromolecular chain extender in 2-8 parts to a fifth zone of a processing middle section of the twin screw extruder;
   blending with the molten mixed material; and
   extruding, drawing, cooling and pelletizing to obtain the recycled material based on in-situ compatibilization and chain extension.

9. The preparation method for the recycled material based on in-situ compatibilization and chain extension according to claim 8, wherein a processing temperature zone of the twin screw extruder is 175 to 235° C.

10. The preparation method for the recycled material based on in-situ compatibilization and chain extension according to claim 8, wherein temperatures of eight processing zones of the twin screw extruder are: 180° C., 180° C., 185° C., 185° C., 235° C., 235° C., 230° C., and 230° C. in sequence.

* * * * *